United States Patent [19]

Bistrick et al.

[11] 4,065,222
[45] Dec. 27, 1977

[54] POT BROACH

[75] Inventors: Eugene J. Bistrick; Axel B. Abrahamsson, both of Warren; Andrew J. Szewczyk, Harper Woods; Frank A. McCabe, Detroit; Richard A. Schlaf, Sterling Heights; Leonard A. Gabriele, Warren, all of Mich.

[73] Assignee: Lear Siegler, Inc., Santa Monica, Calif.

[21] Appl. No.: 734,301

[22] Filed: Oct. 20, 1976

[51] Int. Cl.² ............................................. B26D 1/00
[52] U.S. Cl. ...................................... 407/18; 407/14
[58] Field of Search .......................................... 29/95.1

[56] References Cited

U.S. PATENT DOCUMENTS

| 772,841 | 10/1904 | Smith | 29/95.1 |
| 2,516,518 | 7/1950 | Iversen | 29/95.1 |
| 2,525,098 | 10/1950 | Hougland | 29/95.1 |
| 2,674,780 | 4/1954 | Nielsen | 29/95.1 |
| 3,327,589 | 6/1967 | Anthony | 29/95.1 X |
| 3,332,129 | 7/1967 | Psenka | 29/95.1 |

Primary Examiner—Harrison L. Hinson
Attorney, Agent, or Firm—Whittemore, Hulbert & Belknap

[57] ABSTRACT

A pot broach for cutting small pinions from the solid for use with a pull-up broaching machine, the pot having a multiplicity of solidly abutting flat sided internally toothed cutting rings and internally slotted support rings, with elongated toothed sticks received in the slots of said support rings.

9 Claims, 10 Drawing Figures

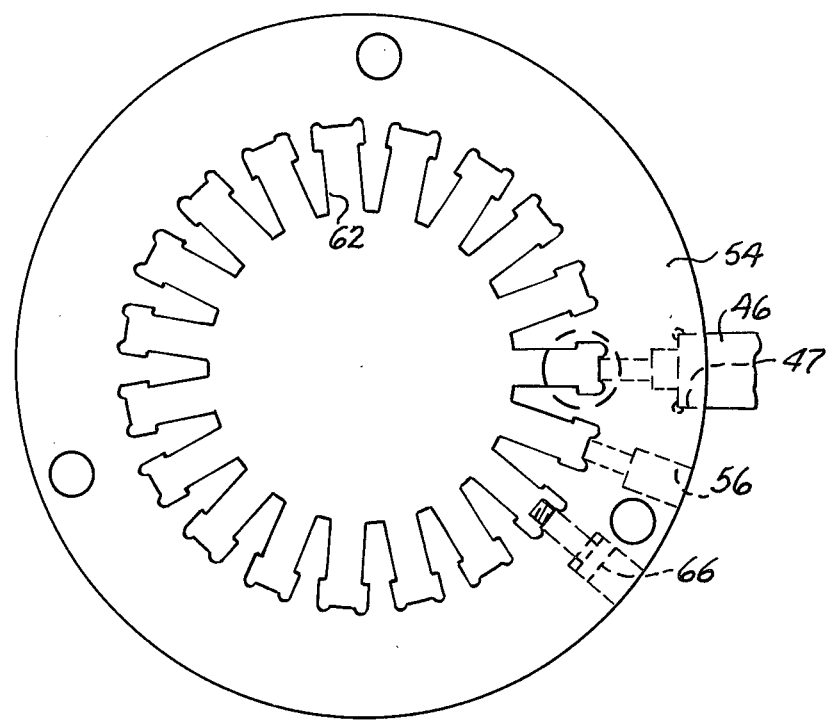
FIG. 7
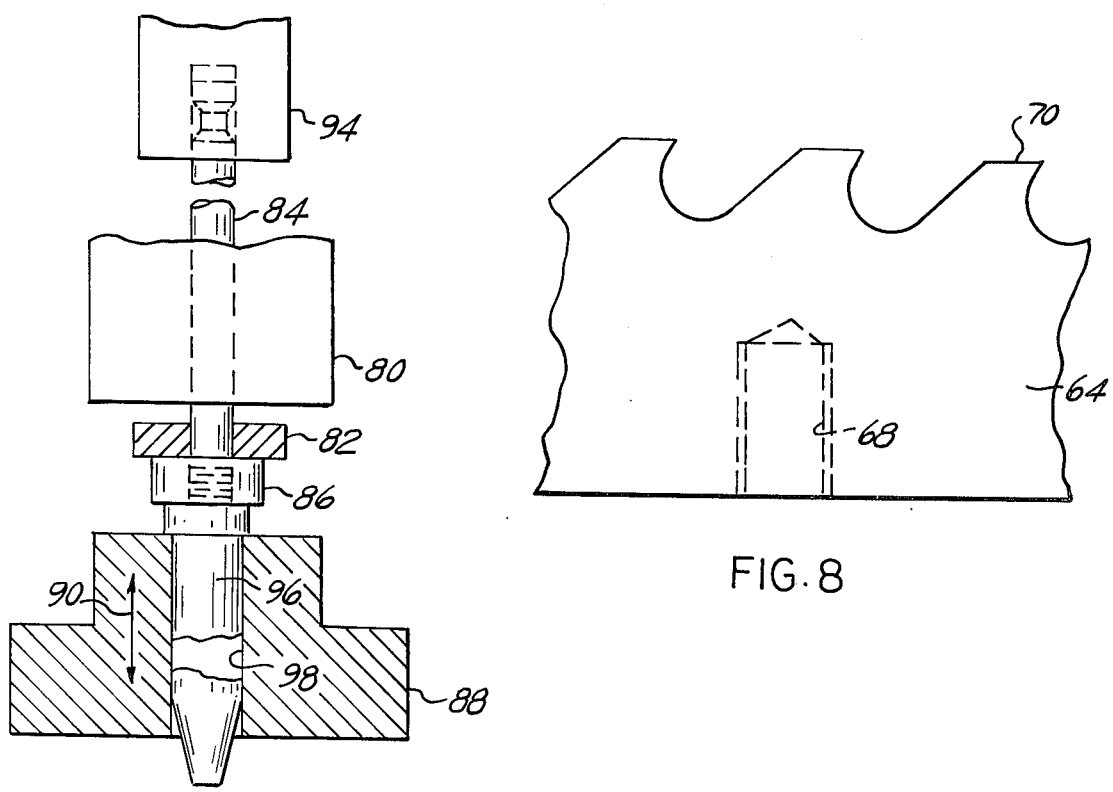
FIG. 8
FIG. 9

POT BROACH

BRIEF SUMMARY OF THE INVENTION

The problem of broaching transmission pinions from a cylindrical steel blank having in some cases outside diameters of less than two inches offers many difficulties. One of these is in machine design in which the parts withstand the forces required to relatively move the broach and workpiece. Another is the problem of machining cutting teeth at the inside of an elongated pot.

The first problem is solved in the present invention by pulling the workpiece through the pot broach by an elongated pull rod having sufficient strength in tension to transmit the required force.

The second problem is solved by providing a pot broach assembly of special design, using a multiplicity of laterally abutting, flat-sided rings, some of which have internal cutting teeth and some of which are slotted and support toothed sticks in their slots.

By the present invention, it is possible for the first time to produce pinions in a single stroke of a smaller diameter, wider face widths, and having deeper tooth spaces than heretofore.

BRIEF DESCRIPTION OF THE DRAWINGS

FIG. 7 is an elevational view of a stick supporting ring;

FIG. 8 is a fragmentary elevational view of a portion of a stick;

FIG. 9 is a fragmentary elevational view, partly in section, showing the connection between the pull rod and retriever.

COMPLETE DESCRIPTION

The problem of broaching the small pinions used in automobile transmissions is complicated by the small size of the opening through a blank onto which teeth are to be cut, which precludes applying force to the blank by a rod under compression. The broaching machine disclosed herein employs a tension rod passing through the gear and adapted preferably to pull the blank through the pot broach. Alternatively, of course, the pull rod may support the blank, while the pot broach is moved over the blank.

Figure 1:
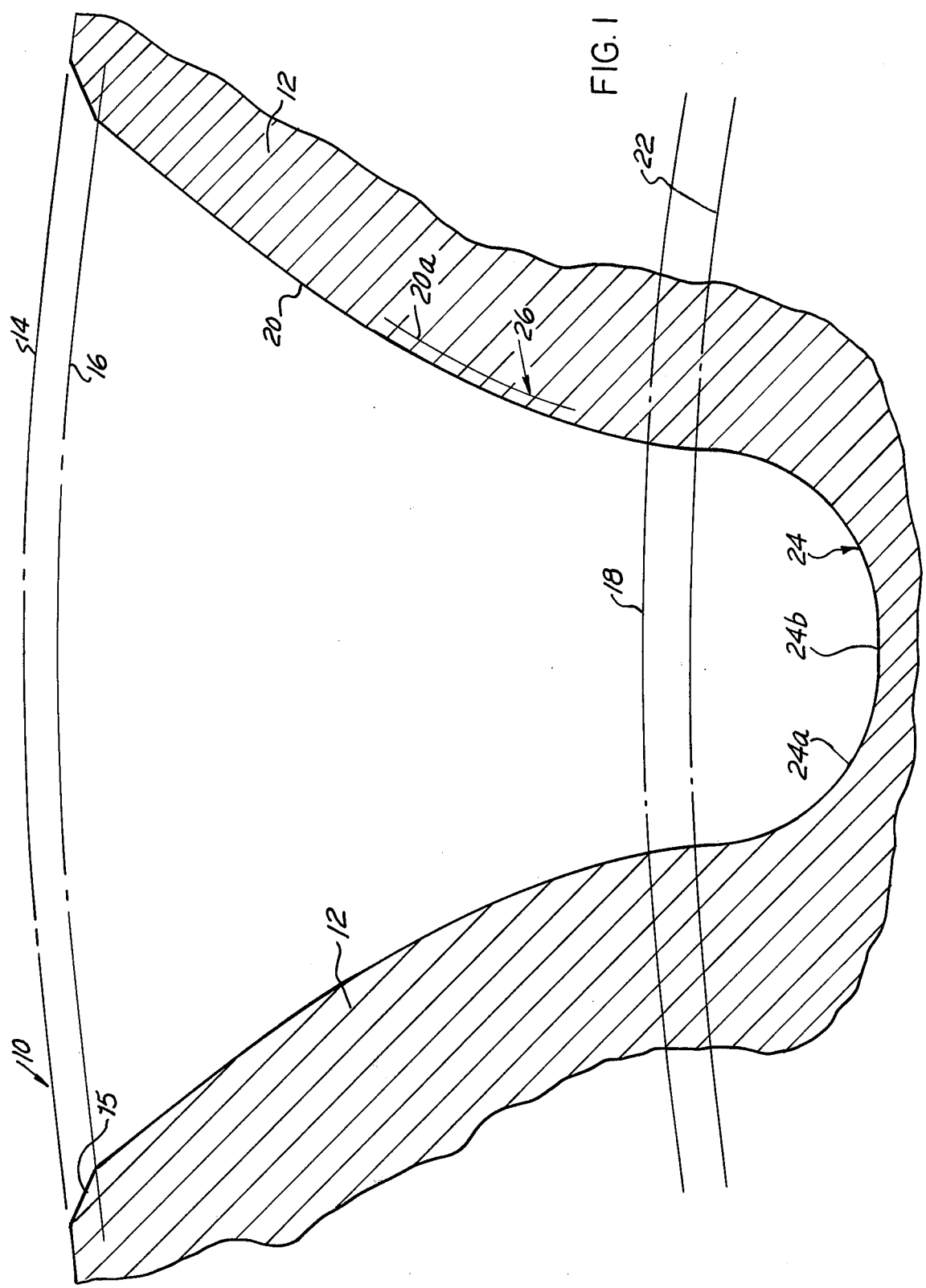
FIG. 1 is a more or less diagrammatic view illustrating the sequence of cuts in a single tooth space.

Referring first to FIG. 1, there is illustrated a single tooth space cut into a blank 10 by the broach teeth between gear teeth 12.

Initial cuts are taken by a sequence of chamfer cutting teeth provided on the cutting rings at the leading end of the broach. These teeth cut from the originally cylindrical surface 14 of the blank to the chamfer diameter indicated by circle 16, and form the chamfers indicated at 15. In a practical embodiment of the invention, the material between lines 14 and 16 is removed by seven chamfer cutting rings.

The following rough cutting rings cut sequentially to greater depth and remove material slightly below the circle 18 which represents the start of active profile (SAP) on the gear teeth 12. It will be understood the tooth profiles 20 are roughly approximated, and that these are generally involute profiles, as required by modern practice in running gears. In a practical embodiment of the present invention, the material between circles 16 and 18 is removed by 54 rough cutting rings.

The pinions require cutting or undercutting below the start of active profile, and below the involute base circle 22, and this is accomplished by a plurality of toothed sticks, one for each tooth space, each of which removes material between line 18 and line 24, the latter representing the bottom of the tooth space. The final tooth on each stick conforms to line 24 which includes arcuate portions. Preferably, the bottom of the tooth space has a narrow straight portion 24b tangent to arcuate portions 24a. In a practical embodiment of the invention, the material between lines 18 and 24 is removed by thirty-nine teeth on each stick.

Finally, the sides of the teeth 12 are finish cut by the teeth of a few finish cutting rings, the teeth being shaped to cut the full involute form between chamfers 15 and the undercut surfaces 24. For this purpose the cutting teeth are of full height, and successive teeth are of slightly increasing width to take very accurate side shaving cuts indicated in part and merely diagrammatically at 26.

In a practical embodiment of the present invention the material removed between the line 20 representing the rough cut involute surface and the line 20a, representing the finished involute surface is only 0.004 inches, and accomplished by twelve finish cutting rings, preferably stepped so that all finishing cutting rings take substantially equal cuts.

Figure 2:
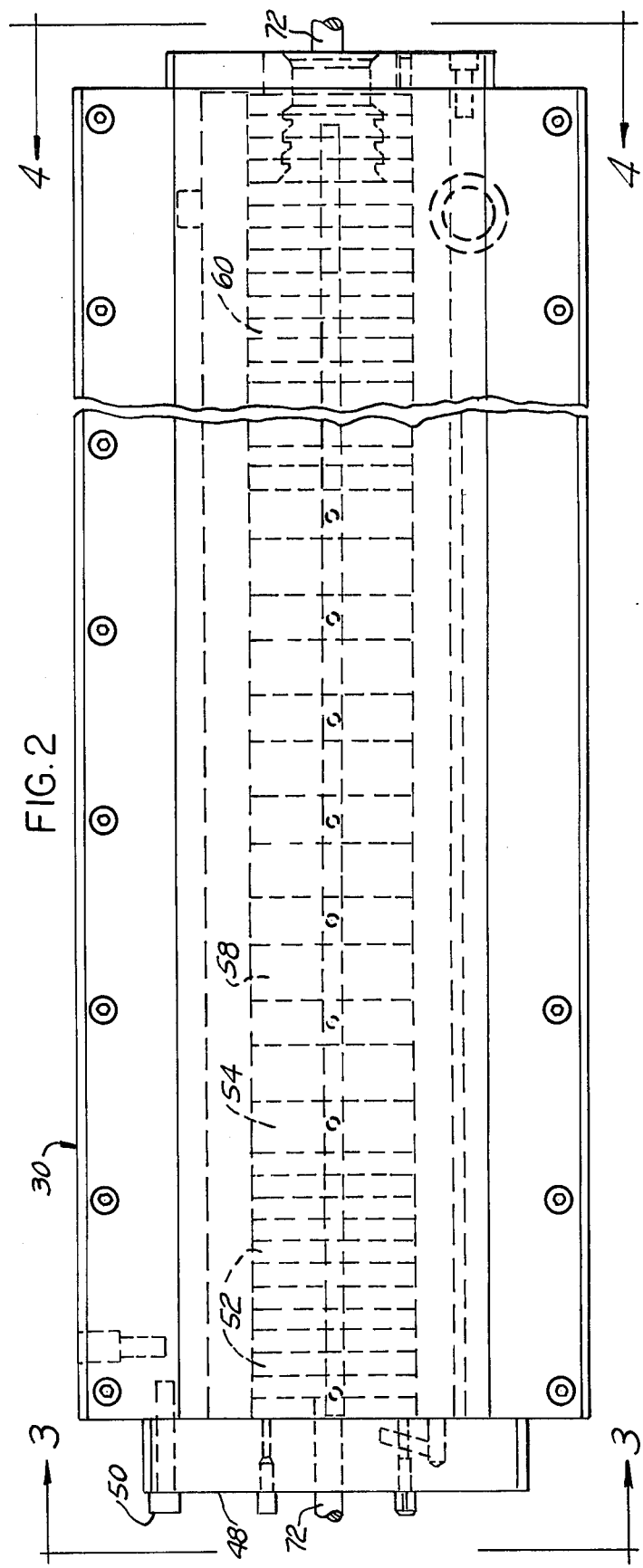
FIG. 2 is an elevational view of the pot broach.
Figure 4:
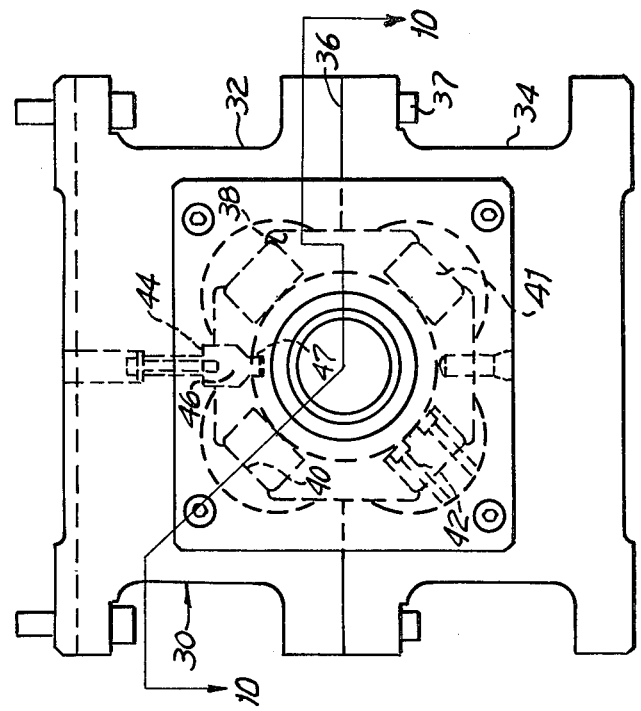
FIG. 4 is an end view of the broach, viewed in the direction of arrows 4—4, FIG. 2.
Figure 3:
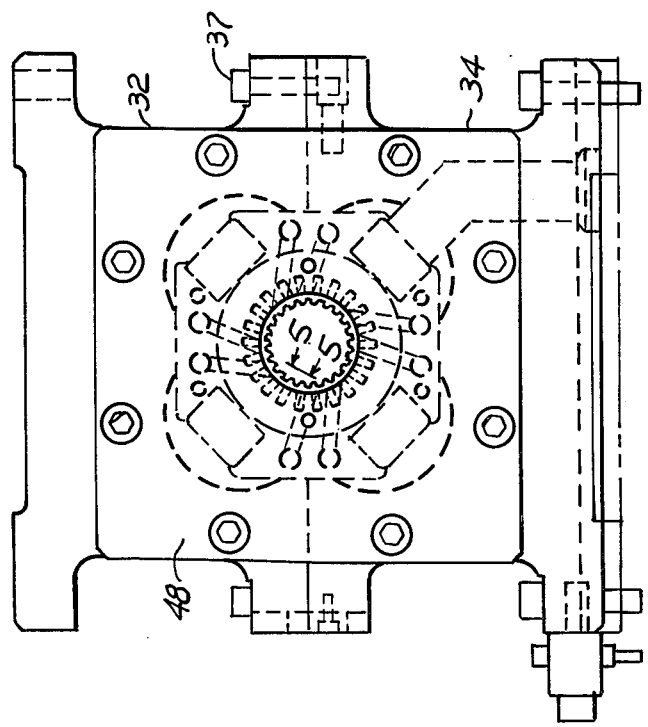
FIG. 3 is an end view of the broach, viewed in the direction of arrows 3—3, FIG. 2.

Referring now to FIGS. 2-8, details of the pot broach assembly are best illustrated in FIGS. 2-4.

The pot which supports the cutting elements is in general an elongated body 30 of generally square cross section formed of two halves designated 32 and 34 and meeting or substantially meeting at the line 36, and urged together by bolts 37 to clamp rings contained therein firmly. Each of the members 32 and 34 has a channel 38 formed therein, each channel having two longitudinally extending ribs having an accurately finished flat surface 40 supporting ring abutting bars 41 bolted thereto as indicated at 42. One of the members, here shown as the trough member 32, is provided with a longitudinally extending groove 44 which receives a key 46 having a narrow key portion extending into an accurately located keyway 47 provided in each of the rings later to be described.

At the trailing end of the pot 30 is an abutment block 48 rigidly affixed thereto by bolts 50 and having attachments for connection to high pressure oil supplied to the interior of the pot.

Within the pot, and backed up against block 48 are a multiplicity of rings. At the trailing end of the pot broach, or the end which does the final cutting are the side shaving or full form finish rings 52. Forwardly of finish rings 52 are a series of stick supporting rings, rings 54 being provided with enlarged counterbored bolt holes 56 and rings 58 being generally similar but lacking the bolt holes of rings 54.

Forwardly of rings 54, 58 are a multiplicity of internally toothed chamferring and rough cutting rings 60.

All of the rings 52, 54, 58 and 60 have flat sides and all are solidly abutted against each other, and the final finishing ring 52 is solidly abutted against block 48 to sustain the cutting thrust.

Figure 5:
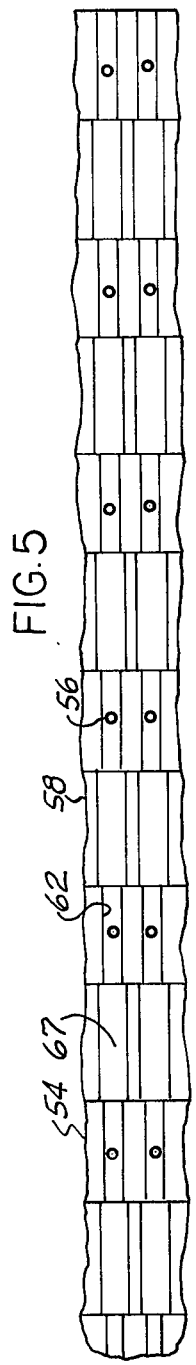
FIG. 5 is a fragmentary elevational view as seen at the arrows S—S, FIG. 3.
Figure 10:
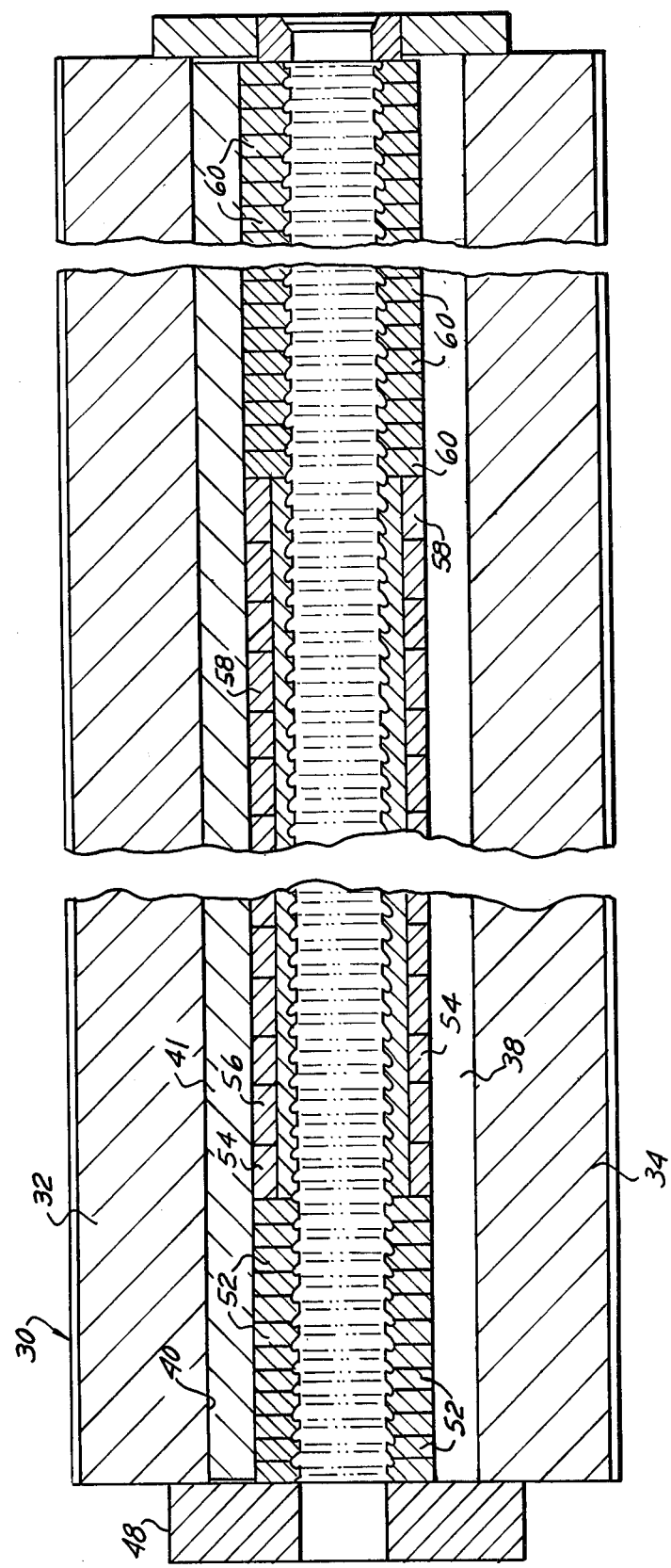
FIG. 10 is a section on the line 10—10, FIG. 4.

Stick supporting rings 54, as best seen in FIGS. 5, 7 and 10, have narrow slots 62 dimensioned to receive and to interfit closely with elongated toothed sticks 64 (see FIGS. 8 and 10) and the bolt receiving openings 56 open into the bottom of slots 62, and headed bolts 66 extend through these openings and into tapped blind holes 68 to retain sticks in place. It will be recalled that all rings are accurately located circumferentially by keys 46 and keyways 47.

In addition, it is essential that sticks 64 are adequately supported to sustain cutting thrusts, and for this purpose the sticks are slightly shorter than the aggregate length of slots in rings 54, 58, and bolt holes 56 are slightly enlarged so that while bolts 66 hold the sticks down tightly against the bottom of the slots, the trailing ends of the sticks solidly abut the leading finishing ring 52.

The rings 58 are provided with radial slots 67 which are aligned with slots 62 but are slightly wider so that they do not engage the sides of the sticks. The bottoms of the slots 67 are, however, at the same radial spacing as the bottoms of slots 62, so that the radially outer edges of sticks 64 are solidly supported throughout.

Figure 6:
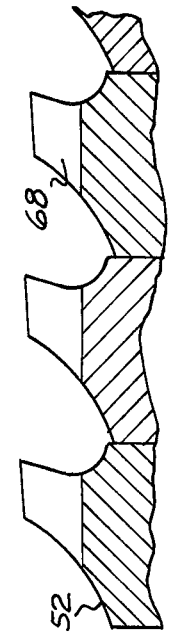
FIG. 6 is a fragmentary sectional view through a few rings provided with cutting teeth.

Referring now to FIG. 6, a few of the cutting rings are shown. These may be the finishing rings 52 or the last few roughing rings 60 but are here designated 52. Each ring has a multiplicity of internal teeth 68, which are radially stepped if roughing teeth, or of increasing width if side shaving finishing teeth. Since each ring has only a single circumferential series of spaced teeth, the teeth may be accurately ground without difficulty.

In FIG. 8 there is shown a piece of a stick 64, having a series of teeth 70 which are progressively increasing height rearwardly to cut the tooth spaces to the full depth. Each stick has a plurality of blind tapped holes 68 for reception of bolts 66 as heretofore described.

In practice, the pot broach 30 is fixedly mounted and a workpiece is drawn through the broach, preferably upwardly, by a pull rod, a portion of which is illustrated at 72 in FIG. 2.

Referring now to FIG. 9, a portion of a pot broach is shown at 80 through which an annular work blank 82 is to be pulled by a pull rod 84. At its lower end the pull rod is detachably secured to a head 86 dimensioned to support the blank 82 and to pass through the broach without contacting the cutting teeth therein. A retriever 88 is vertically movable on the frame, as indicated by arrows 90.

The pull rod 84 is illustrated as having a diameter dimensioned to pass through the central hole in the annular blank 82. The upper end of the rod is shaped for detachable connection to a puller 94, which may be actuated by a hydraulic piston and cylinder device.

The head 86 includes an elongated cylindrical guide extension 96 movable in a guide opening 98 in retriever 88. With the parts in the position shown in FIG. 9, puller 94 is actuated to move vertically upwardly. Retriever 88 is stationary, so that as work blank 82 enters the broach, guide extension 96 is slidably guided in opening 98 in the retriever. In a practical embodiment of the invention, the guide extension is about 20 inches in length so that the lower end of the pull rod is maintained in accurate concentricity with the broach until the workpiece has traveled a substantial distance into the broach, at which time the spline major diameters in the rings take over the guiding action.

When the finished gear is moved out of the upper end of the broach it is retained by suitable jaws, not shown, and the pull rod is then moved downwardly so that the tapered lower end of guide extension 96 enters opening 98 in the retriever 88, which is lowered and lowers the pull rod until its upper end is below the position occupied by the next workpiece. When the upper end of the pull rod has moved downwardly through the finished gear, the gear is removed. A new work blank is positioned above the upper end of the pull rod, and the retriever then elevates the pull rod until head 86 engages the underside of the gear 82, and the upper end of pull rod 84 is again coupled to puller 94.

What is claimed as the invention is:

1. A pot broach assembly for cutting a multiplicity of gear teeth on the periphery of an initially cylindrical blank in a single pass, said assembly comprising
   a longitudinally segmental rigid tubular support body,
   a first series of flat sided abutting internally toothed cutting rings, each ring having a multiplicity of cutting teeth arranged in a single circumferentially extending array, and
   a second series of flat sided abutting locating and support rings, said second series rings having internally open, radially extending, circumferentially spaced slots, flat sided elongated sticks received in said slots, said sticks having progressively stepped cutting teeth adapted to remove material from the bottom of tooth spaces cut by the cutting teeth of said first series of rings.

2. An assembly as defined in claim 1, said second series of rings comprising alternate locating rings and support rings, said locating rings having counterbored openings extending radially from the outer surface thereof opening into the bottom of each slot, said sticks having tapped openings in registration with said counterbored openings, and screws extending through said counterbored openings into said tapped openings.

3. An assembly as defined in claim 2, the slots of said support rings having bottom support walls in longitudinal alignment with the bottom walls of the slots of said locating rings to engage and support the radially outer edges of said sticks.

4. An assembly as defined in claim 3, the slots of said support rings being circumferentially wider than the slots of said locating rings to provide clearance with respect to the flat sides of said sticks therein.

5. An assembly as defined in claim 1, comprising in addition a third series of flat sided abutting internally toothed finish cutting rings, each ring having a multiplicity of side cutting teeth arranged in a single circumferentially extending array, the teeth of successive finish cutting rings being progressively wider as measured circumferentially of said rings and shaped to take finish cuts for substantially the full working height of teeth on the work gear.

6. An assembly as defined in claim 5, the ends of said sticks opposite to the direction of cutting of the cutting teeth thereon being in abutment with the flat surface of the adjacent ring of said third series of rings.

7. An assembly as defined in claim 6, the following ends of said sticks being located in the plane of the flat side of the final one of said locating and supporting rings whereby the cutting thrust of all of said cutting rings as well as of said sticks is taken by adjacent abutting flat sided rings.

8. An assembly as defined in claim 4, comprising fasteners securing said sticks firmly against the bottom of said slots in said locating rings with provision for limited longitudinal movement to insure solid support of both the ends of said sticks and the array of slotted locating and support rings from rigid support means in said support body.

9. An assembly as defined in claim 5, the two halves of said support body having troughs or recesses extending longitudinally thereof, and a rigid support block affixed to one end of the support body to provide solid support for all cutting elements therein.

* * * * *